United States Patent [19]

Ziegenbalg et al.

[11] 4,224,287
[45] Sep. 23, 1980

[54] PROCESS FOR THE PREPARATION OF PURE ALUMINUM OXIDE

[75] Inventors: Siegfried Ziegenbalg; Gerhard Fischer; Gerhard Haake; Rudolf Siebert, all of Freiberg, German Democratic Rep.

[73] Assignee: VEB Mansfeld Kombinat Wilhelm Pieck, Lutherstadt Eisleben, German Democratic Rep.

[21] Appl. No.: 32,904

[22] Filed: Apr. 24, 1979

[30] Foreign Application Priority Data

Apr. 24, 1978 [DD] German Democratic Rep. ... 204962

[51] Int. Cl.² .............................................. C01F 7/22
[52] U.S. Cl. ................................. 423/112; 423/126; 423/132; 423/335
[58] Field of Search .................... 423/112, 126, 132

[56] References Cited

U.S. PATENT DOCUMENTS

| | | | |
|---|---|---|---|
| 2,249,761 | 7/1941 | Hixson et al. | 423/132 |
| 2,267,490 | 12/1941 | Buche et al. | 423/132 |
| 2,376,696 | 5/1945 | Hixson et al. | 423/132 |
| 2,413,709 | 1/1947 | Hoffman | 423/126 |

OTHER PUBLICATIONS

Miller et al., "Chemical Absts.", vol. 38, 1940, pp. 1079-1080.

*Primary Examiner*—Herbert T. Carter
*Attorney, Agent, or Firm*—Michael J. Striker

[57] ABSTRACT

In the process for the preparation of pure aluminum oxide by the steps of hydrochloric acid decomposition of mechanically or thermally activated clay or alumina containing minerals, separating the insoluble residue, removing the iron from the solution, crystallizing the aluminum chloride in the iron-free solution, thermally decomposing the crystallizate to aluminum oxide and recovering the hydrochloric acid from the decomposition gases, the improvement comprising effecting the process by the steps of mechanically pretreating the clay, drying the pretreated clay, thermally or mechanically activating the clay, subjecting the activated clay to circulating leaching, separating the leached material into an $SiO_2$ containing residue and an $AlCl_3$ solution, extracting the $AlCl_3$ solution to an evaporating crystallization and thermally decomposing the crystals to produce $\alpha$-$Al_2O_3$. All of the stages are interrelated one to the other for maximum recovery of byproducts, heat, acid and the like. The $\alpha$-$Al_2O_3$ is directly produced in a form of high purity suitable for most applications.

13 Claims, 1 Drawing Figure

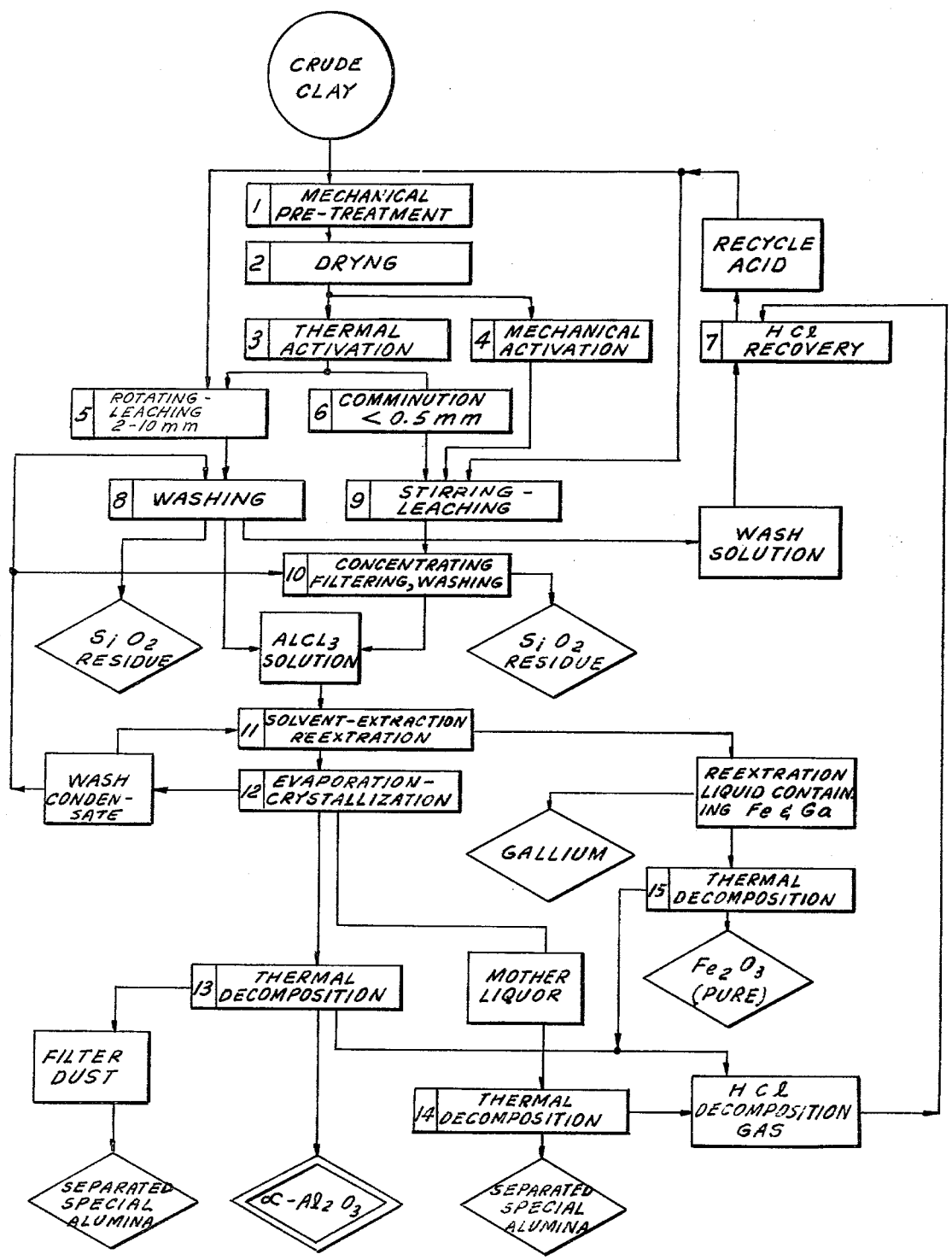

PROCESS FOR THE PREPARATION OF PURE ALUMINUM OXIDE

The instant invention relates to a process for the preparation of pure aluminum oxide and more particularly relates to a process for the hydrochloric acid treatment, i.e. decomposition, of clay or alumina containing minerals for preparing pure aluminum oxide.

A process is known for preparing alumina from clay involving the steps of providing for mechanical and thermal clay pretreatment; hydrochloric acid decomposition; separation of the silicic acid rich residue; crystallization of $AlCl_3.6H_2O$; thermal decomposition of the crystals to crude alumina; recovery of the decomposition acid and of the decomposition gases; preparation of a sodium aluminate solution by decomposition of the crude alumina by means of soda lye (caustic soda); precipitation of aluminum oxide hydrate from the aluminate solution through inoculation or seeding of the solution under stirring; and calcination of the aluminum oxide hydrate to alumina (DT-OS 11 00 011).

An essential disadvantage of this process is the large number of process steps or stages required for the recovery of a sufficiently pure alumina product. The purification of the alumina does not take place in the alumina formation process carried out by hydrochloric acid decomposition but only through after arranged alkali purifying stages. The aforesaid process is thus in its requirements for apparatus and energy markedly stressed or burdened in that the carrying out of the aforesaid process is associated with unbearably high and, therefore, unacceptable costs.

There has also been proposed a process for the recovery of alumina by the precipitation of pure $AlCl_3.6H_2O$ from the impure aluminum chloride solution formed in the hydrochloric acid decomposition involving conducting pure hydrochloric acid gas at a low temperature therethrough. The disadvantage of this process lies in that large amounts of heat are required to be drawn off from the solution because of the low temperatures necessary in order to achieve a satisfactory absorption of the hydrochloric acid gas. Further, the recovery of a high percentage hydrochloric acid gas from the end solution that is obtained from the split or cleavage gas produced in the thermal decomposition requires a considerable outlay for energy and apparatus and is, therefore, very costly.

It is additionally known from DRP 414 128 to employ a process in which a part of the hydrochloric acid decomposition solution which has been obtained from the process step in which there is separated an aluminum chloride crystalline pulp or mash, is evaporated and where the other part of the said decomposition solution is used to absorb the comparatively dilute exhaust gas and water vapor containing hydrochloric acid gas, as for instance by passing the same through a rotating oven where the thermal decomposition is being carried out. The thusly recovered (about 20%) hydrochloric acid is then used for washing the crystalline mash with the objective of separating out iron and aluminum chloride therefrom. In this washing process an unbearable amount of the aluminum is permitted to be taken off because the solubility of the aluminum chloride is increased with increasing hydrochloric acid concentration. A further disadvantage of this process lies in that there can be introduced into the circulation only iron-free hydrochloric acid as a washing solution, the manufacture of which additionally burdens the process. Still a further disadvantage of this proposed process is to be found in the fact that because of the presence of iron-III-ions there is formed with the aluminum chloride mixed crystals from which the iron, despite repeated washing, cannot be removed. As a result the iron content in the decomposition solution is increased and the use of this iron containing solution as wash water for the alumina leaching made impossible.

A further development of the last-mentioned process is also known from DRP 438 745, according to which the hydrochloric acid enriched solution is not only used for washing the aluminum chloride crystalline sludge but also for decomposing further quantities of clay. It is also already in the art to enrich the solution with hydrochloric acid and effect the decomposition of clay not separately, but combined with another step so that the solution with the absorbed hydrochloric acid containing gas and the alumina containing raw material are brought into contact with one another in the working process. There thusly results that the taken-up hydrochloric acid is directly used in the decomposition and the ability of the solution for absorbing further hydrochloric acid is maintained. A concentrated hydrochloric acid solution is recovered from the clay treatment without the necessity for previously preparing concentrated hydrochloric acid. However, this process does not solve the impurity problem. A further disadvantage of this process is the high cost outlay for apparatus in that additional absorption installations are required to be installed utilizing a counter-current arrangement in order for the aforedescribed results to be realized.

A process is also known for manufacturing alumina from clay (DRP 562 498) in which the iron is separated from the hydrochloric acid evaporated clay decomposition solutions following the thermal decomposition step through chlorinated volatilization. For the volatilization to be effectively carried out, it is necessary to use higher concentrated hydrochloric acid streams which in turn gives use to the requirement for additional process materials. Further this process also requires considerable cost outlays for apparatus and energy.

A further but different disadvantage of this aforesaid known process is that there is additionally required the introduction of alkali chlorides, i.e. chlorides of calcium or magnesium in that for the volatilization of the iron, a predetermined ratio of $Fe_2O_3:Al_2O_3$:alkali-, $MgCl_2$, $CaCl_2$ must be established and maintained.

After the separation of the iron, the end product must be washed with iron-free water so that it can be freed from the salt remaining in association with the alumina, that is, the previously-mentioned chlorides must through additional and further washing steps now be removed.

In order to maintain the addition within the required limits of the process, there must be employed in these processes only clays having reduced iron contents.

For the manufacture of aluminum chloride as described in OS 15 92 064, OS 15 92 060, and namely for recovering the aluminum from such aluminum chloride, suitable aluminum oxide must first be manufactured. Proposals have been advanced in this connection in which the crystallization of the aluminum chloride is carried out in such a way that this product has before its thermal decomposition, a composition as will ensure that the aluminum oxide formed exhibits a sufficient or adequate purity. This is brought about through a multi-stage fractionation crystallization process. Through incomplete crystallization, there is obtained in the first stage an adequately pure crystallizate. The residual solution which contains much of the impurities flows following separation of the suspended crystallizate therefrom into a second stage. The crystallizate originating in the second stage is recycled back into the first stage and the impurity enriched residual solution obtained from the second stage is then passed into the third stage. This fractional crystallization process can only be carried out under use of considerable apparatus. The multistage crystallization has requirements for apparatus for use in the crystallization per se, the recycling of the solution into a prior crystallization stage following the solid liquid separation and the remashing of the crystalline remains after each of the stages, i.e. for each stage there are required crystallizators, centrifuges, heated steepers, dissolving vessels, pumps and the like.

A further disadvantage of this last-mentioned proposal (OS 15 92 070) lies in that the amount of the end solution taken off can be held to replaceable limits, only if the starting solution contains reduced amounts of impuirities, i.e. that there is used only relatively pure clay or alumina-containing minerals as starting material. Removed impurities as for instance titanium salts, are only very poorly removed, if at all through precipitation using sulfuric acid in the presence of calcium ions.

There is also known a process for separating iron (III) chloride from aqueous solution containing aluminum chloride and iron (III) chloride by using a selectively acting water insoluble organic reagent for separating out the iron (OS 15 92 065).

This iron separation is indeed to be sure a necessary condition for producing aluminum oxide that is to be used as a feed material in an electrolytic cell for the recovery of aluminum. The aforesaid process provides for the manufacture of an extensively iron-free aluminum chloride but unfortunately disregards other impurities as for instance sodium, magnesium or calcium. The removal of the latter impurities is necessary if there is to be produced a high quality alumina product. A further known process (H. O. Poppleton, D. L. Sawyer, Hydrochloric Acid Leaching of Calcined Kaolin to Produce Alumina TMS-paper selection, Paper No. A 77-66) discloses the manufacture of alumina from the hydrochloric acid decomposition of calcined raw clay with succeeding stages of solid-liquid separation, iron separation, crystallization and thermal decomposition which process requires the steps of preparation of a far reachingly pure $Al_2O_3.6H_2O$ crystallizate through large particle crystallization according to the fluid bed process, followed by washing with concentrated hydrochloric acid in a centrifuge. The large particle crystallization of $AlCl_3.6H_2O$ is made difficult by a narrow metastable region or zone and a high nuclei formation velocity. As result, the end precipitation rate of the crystals in the solution, because of the higher solution viscosity and reduced density difference between the crystals and the solution, is very small. Using the flowbed process results in a reduced streaming or flow velocity of the supersaturated solution in the crystalline whirling layer, to reduced crystal amounts for every m$^3$ supersaturated solution and lower specific crystallization output. A further disadvantage of this known process is the necessity of recovering concentrated hydrochloric acid from the impure wash solution. The necessary amounts of hydrochloric acid as compared to reduced impurity solubility is considerable.

F. A. Peters, D. W. Johnson and R. C. Kirby, Forschungsbericht 6133, Bureau of Mines, also describe a process for manufacturing alumina by hydrochloric acid decomposition of crude clay. This last-mentioned process, as in all of the other known processes, describes the hydrochloric acid decomposition of clay or alumina containing minerals for recovery of alumina and discloses single process stages without any far reaching consideration for the poor take-off of products and for the recirculation of solutions and reaction materials (closed circulation). The known processes are further characterized through a deficient consideration or regard for impurity sluices or waste material sewers and also for the recovery of utilizable separated byproducts. Also the requirements arising in connection with environmental safeguards are only incompletely visualized and therefore not provided for.

The chemical composition and the physical properties of the alumina are also not furnished by the publications describing the aforesaid procedures so the suitability of these processes for aluminum recovery, at the very least, often remains an unknown factor.

The manifold and frequent technical disadvantages, energy requirements and therewith uneconomical nature of the heretofore carried out processes are the reason why up to this point in time their utilization in practice under large scale technical conditions has not been realized.

It is an object of the instant invention to provide a technical and apparatus favorable process for use in the recovery of pure aluminum oxide from clay or alumina containing minerals based on hydrochloric acid decomposition of the clay or alumina containing minerals in a form where for the first time the process can be carried out using large scale technical conditions, and then in a technically simple and economically favorable manner.

A further object of the invention is to provide a process using readily accessible but possibly unfavorably composed raw materials within a closed circulation, producing the least possible amount of byproducts and which is based on a small number of optimally arranged stages, the said process meeting all of the environmental requirements.

It is also an object of the invention to provide a process whereby the most complete possible separation of impurities is realized so as to permit the recovery of an aluminum oxide corresponding to its purity to the requirements of the aluminum industry.

It is still a further object of the invention to manufacture alumina which meets the requirements of the aluminum industry, i.e. to provide an alumina which has the requisite physical parameters.

These and other objects are met in accordance with the invention by a process for the manufacture of aluminum oxide comprising the following working stages:

Freshly mined raw clay is first brought into a form suitable for further processing by mechanical pretreatment, utilizing therefor a shaping or molding apparatus as, for instance, an extrusion press or an apparatus adapted for applying sufficient shearing stress thereto.

The product thus obtained is then dried at 130°-250° C. by introducing the mechanically pretreated clay material having a particle size of 2-15 mm into a drying mill in order to form a material having a particle size preferably of 0-1 mm and a residual moisture content not exceeding 3%.

There follows a mechanical or thermal activation of the dried material with the aim of converting or transforming the acid insoluble kaolin into soluble metakaolin.

The thermal activation of the clay or alumina containing mineral is conducted in one or more stages at 600°–800° C.

It is of considerable importance for the process of the invention that through suitable processing procedures a substantially complete oxidation of the organic substances and of the iron present in the starting material is obtained so that oxidative aftertreatment of the decomposition solution can be avoided. Through careful selection of the working conditions in the thermal activation, the iron II chloride content of the decomposition solution can be reduced to a value <10 mg/l.

The mechanical or thermally activated material is then passed to an afterarranged hydrochloric acid leaching stage the conditions of which are established for realizing the most complete decomposition of the leachable clay portions, while only a reduced co-solution of the impurities is effected. According to the invention, the leaching with hydrochloric acid is carried out in dependence of the particle size of the pretreated clay; using a percolating leaching or a so-called rotating (recycling) leaching for the large particles of clay, i.e. clay having particle sizes within the range of 2–20 mm, or a suspension leaching for fine particle size clay, i.e. clay having a particle size within the range of 0–2 mm.

The working conditions and the results of the circulating leaching are the following:

| Particle size of clay | 2–20 mm |
| --- | --- |
| hydrochloric acid concentration | 15–25% |
| stoichiometric HCl charge (calculated on $Al_2O_3$) | 80–120% |
| decomposition temperature | 105–110° C. |
| decomposition duration | 6–12 hours |
| $Al_2O_3$ yield | 80–90% |
| Fe solubility | 50–60% |

For the suspension leaching, the above-noted processing are carried out but with a shortened leaching time depending on the particle size of the clay and namely for up to 30–120 minutes.

With the use of this leaching principle, the afterarranged solid-liquid separation can be carried out in the known manner by passing the leached material through a thickener, rotating cell filter or other suitable apparatus whereby the use of flocculating agents on the basis of polyacrylamide provide for an essential improvement in the sedimentation and filtration properties of the material batch.

By use of stoichiometric, preferably less than stoichiometric acid amounts, calculated on the charged clay, any dissolved titanium is hydrolytically precipitated and can then be absorbed from the leaching residue.

Thereby a wide reaching titanium removal from the solution is made possible so that a calcium sulfate precipitation in the crystallization can be eliminated. The titanium content is in accordance with the invention removed down to a value of <5 mg/l.

The $SiO_2$ rich residue is then subjected to a multistage washing procedure. Because of its hydraulic properties, the material's characteristic solidity and reduced bulk density as well as its high content of amorphus silicic acid, the $SiO_2$ rich material constitutes a valuable starting component or additive adapted especially for use in the construction and glass industry. In addition, numerous other industries can utilize this material for instance as a filler.

After leaching, the resulting solution has the following composition:

| $Al_2O_3$ | 80–100 g/l |
| --- | --- |
| $Fe_2O_3$ | 4–8 g/l |
| HCl (free) | 5–50 g/l |
| $Na_2O$ | 0.1–0.3 g/l |
| $K_2O$ | 2–3 g/l |
| $TiO_2$ | <5 mg/l |
| $V_2O_5$ | 30–60 mg/l |
| $SiO_2$ | 50–100 mg/l |

In accordance with the invention there then follows an iron separation from the aluminum chloride solution having the aforenoted content of iron (III) chloride, free HCl and about 190–280 g/l of chlorides through a liquid-liquid extraction.

The substantially water insoluble organic solution which is used for the extraction is prepared on the basis of a higher paraffin hydrocarbon and preferably one in the boiling range of 145°–200° C. which contains 5–15% of a secondary aliphatic amine having 6–12 carbon atoms and in order to lessen the formation of a third phase, additionally contains a higher aliphatic alcohol having 6–12 carbon atoms in a concentration of 20–40 wt. %.

After the separation into phases has taken place, the iron in the organic phase is extracted in a second extraction stage with water and preferably with dilute hydrochloric acid having a content of 10–40 g/l free acid. The thusly obtained iron-free organic phase can then be reused for use in the first extraction stage.

The volume ratio of the organic to the aqueous phase used in the extraction amounts to a ratio of 1:1 to 1:5 and in the re-extraction of 3:1 to 7:1. The satisfactory temperature for the exchange process lies between 25° and 40° C. It is of special significance for the process of the invention that the $Fe_2O_3$ content in the extracted solution, because of the complete oxidation of the organic components which has taken place during the calcination, is decreased to less than 10 mg $Fe_2O_3$/l.

In place of the extraction agent on the basis of the secondary aliphatic amine, there can also be used a solution of tributylphosphate whose ratio to the aqueous phase preferably amounts to 1:2.

The re-extraction of the iron follows then at a phase ratio of 4:1 to 6:1.

In the extraction phase, the separated iron chloride solution can be worked up according to the known spray decomposition processes under recovery of the HCl and of highly valuable iron oxide.

For recovering further valuable components, as for instance gallium from the strong iron containing re-extraction liquid, there can be used a liquid-liquid extraction on the basis of an extraction agent comprising water containing an insoluble higher aliphatic alcohol in admixture with benzene or kerosine, a long chain aliphatic amine or n-tributylphosphate.

In accordance with the invention, the extracted aluminum chloride solution containing about 20 wt. %, aluminum chloride is evaporated to about 30 wt. % in a single or multi-stage procedure. The, about 30% aluminum chloride solution flows thereafter to a crystallization apparatus. It has been found that on the basis of the physical-chemical properties of the solution and crystals the suspension circulation principle is especially suitable, that is through the circulation of the suspension a large part of the crystals are brought into the boiling zone and therewith through an effective building up of a supersaturated solution, the crystals are separated out in excellent yield.

This crystallization procedure produces a tricklable crystallizate having a reduced moisture content. Through washing with fresh solution in a centrifuge the impurities are successfuly reduced to $2 \cdot 10^{-1} \% K$, $3 \cdot 10^{-2} \% Ca$, $4 \cdot 10^{-4} \% Ti$, $2 \cdot 10^{-3} \% V$ and $6 \cdot 10^{-5} \% SiO_2$. At an average crystallizate particle size of at least 0.25 mm and a residual moisture content of 1-7%, a mother liquor is taken off amounting to only 1-7% of the introduced amount of fresh solution. This mother liquor can through thermal decomposition be made available for crude alumina manufacture and also can be worked up for other objectives.

The recovered crystallizate containing 52-54% $AlCl_3$ is then passed to a two-stage thermal decomposition.

In the lower temperature stage (150°-200° C.) there is carried out a partial decomposition using in this connection the hot flue gases recovered from the high temperature stage. The composition of the intermediate products are so adjusted or standardized that the decomposition gas formed in the high temperature stage contains at least 3 volume % HCl. There is realized at 1200°-1300° C. without any further introduction of HCl gas or other chlorination agent, a wide ranging chlorination volatilization and purification, particularly of the alkali- and earth alkali metals.

The α-portion of the alumina obtained corresponds to the requirements set for melt electrolysis.

The flue or waste gas which is produced in the thermal decomposition of the aluminum chloride is treated in the known manner of an adiabatic or isothermic HCl absorption, for recovery of a 15-25% decomposition acid.

The process of the invention shows in comparison to the heretofore known processes a series of important advantages and distinctions:

Through the use of the principle of the whirling bed in the thermal activation, there results in there being obtained good heat transfer conditions and accordingly high specific outputs and performance with excellent space time yields. The whirling bed principle also makes possible very constant temperatures, so that an overheating of the calcinate and a therewith linked solubility reduction of the alumina content, is prevented. As a specific advantage, the process of the invention provides the alternative of either a circulating or suspension leaching. This permits the working up of a broad particle size spectrum of the clay.

The leaching of the clay particles according to the circulating leaching principle has in comparison with the suspension leaching, the technical advantage that after completion of the leaching process, no separate separation of the solution from the residue in a separate or special apparatus is required but rather the solution can be treated in an automatic filtration system to obtain a solids poor solution.

A further essential advantage of the instant process is to be found in the crystallization stage. The recovered crystallizate contains after its centrifugation only very little residual moisture, that is, it contains very little impurity rich mother liquor so that the necessary crystallizate purity can be realized merely through washing with evaporated first running solution in the centrifuge.

Another advantage of the process of the invention is that 80-85% of the first running sodium and potassium are volatilized in the thermal decomposition. Two-thirds of the first running calcium are also volatilized and are thereby separated from the alumina. This further purification of the alumina is a prerequisite for the uncomplicated $AlCl_3.6H_2O$ crystallization which follows and so that the outlay for apparatus and energy can be markedly decreased. As an impurity sluice or take-off for the volatilized chlorides, there is utilized an electrical gas purification apparatus in which the impurities in the form of a filter dust are separated and this, because of its high aluminum oxide content, can be easily worked up, for example, to make aluminum sulfate.

The process of the invention provides further advantages through the provision of a continuous series of prearranged single processing stages formulated for optimal energy interrelationships of one stage to another, so that apparatus and energy economies not heretofore realizable are brought about. The process is further characterized in that it results in the recovery of a pure alumina product meeting all of the demands of the industry.

The process of the invention provides for the first time a procedure based on hydrochloric acid decomposition which through utilization of the precipitated and separated byproducts and compliance with environmental needs represents a substantial advance in the art.

The process is further illustrated by the example which follows and by the hereto appended drawing.

EXAMPLE

Crude clay which in the freshly mined state contains 20-24% moisture is according to a semi-wet process mechanically pretreated (1) whereby the coarse size reduction of the batch is carried out in a cutter block crusher. Fine particulation and homogenization is then carried out in a wet sieve grinder and a product having the requisite profile is formed in an extrusion press.

After drying (2) at 105° C., there is obtained a production having the following composition:

| | |
|---|---|
| $Al_2O_3$ | 30.6-34.0 |
| $SiO_2$ | 45.1-46.4 |
| $Fe_2O_3$ | 2.40-2.65 |
| $TiO_2$ | 2.05-2.20 |
| $Na_2O$ | 0.018-0.024 |
| $K_2O$ | 0.05-0.15 |
| loss on ignition | 12.2-13.6 |

This material is thereafter thermally activated (3) at 600°-800° C. From this stage, the recovered calcined alumina having the grain size of 0-20 mm preferably 0-10 mm is following separation of the small particles having a size of up to 2 mm subjected to a percolating leaching using 1 ton of leaching solution according to the circulating leaching principle (5) with the following indicated amounts of compounds being present:

| | | | |
|---|---|---|---|
| $Al_2O_3$ | 380.0 kg | CaO | 2.7 kg |
| $Fe_2O_3$ | 34.8 kg | $TiO_2$ | 16.4 kg |
| $V_2O_5$ | 0.6 kg | $K_2O$ | 10.8 kg |
| $SiO_2$ | 549.0 kg | $Na_2O$ | 0.6 kg |

80-90% Of the $Al_2O_3$ content of the clay are present in leachable form. The clay is introduced into the reaction container of the circulating leaching apparatus, 3,342 liters 20% HCl or an amount of 90% of the stoichiometric amount calculated on $Al_2O_3$ of the acid required are also introduced into the leaching container and the clay leached for 8 hours at a boiling temperature of about 105°–110° C. There is obtained 2,896 liters impure aluminum chloride solution having the following composition:

820.0 kg $AlCl_3$
50.5 kg $FeCl_3$
28.6 kg HCl and aluminum chloride containing wash water which is introduced into the acid recovery stage (7).

There is obtained in this working stage 1,254 kg leaching residue having the following composition:

66.5 kg $Al_2O_3$
8.7 kg $Fe_2O_3$
549.0 kg $SiO_2$
627.0 kg $H_2O$
2.5 kg Cl

The extraction of the iron (II) from the solution takes place using as extracting agent a secondary aliphatic amine in an organic solvent and a phase ratio of organic phase to aqueous phase of 1:2 having the following composition:

10 wt. % sec. aliphatic amine
30 wt. % aliphatic higher alcohol
60 wt. % paraffin-hydrocarbon The aqueous solution is following the extraction substantially iron free and remains concerning its further composition unchanged. The re-extraction of iron from the organic phase then follows, using therefor 361 liters condensate from the evaporation stage of the crystallization in a phase ratio of organic phase:aqueous phase of 5:1, whereby the aqueous re-extract contains about 48 g/l iron.

The purified aluminum chloride solution is evaporated in vacuum evaporator (12) up to saturation. There are recovered 2,175 liters saturated $AlCl_3$ solution and 734 liters weak acid vapor condensate. The evaporated solution has the following composition in wt.-%.

29.00 $AlCl_3$
0.20 NaCl
0.50 KCl
0.25 $CaCl_2$
0.012 $FeCl_3$
0.003 $SiO_2$
0.003 $TiCl_2$
0.004 $V_2O_5$ and flows from the crystallization installation (12).

There is thusly obtained 1,470 kg crystallizate, 1,234 liters substantially HCl free vapor condensate and 163 liter mother liquor. The crystallizate contains after washing with evaporated $AlCl_3$ solution and following centrifugation about 53.5 wt. % $AlCl_3$
0.02 wt. % NaCl
0.05 wt. % KCl
0.025 wt. % $CaCl_2$
0.0014 wt. % $FeCl_3$
0.0003 wt. % $SiO_2$
0.0003 wt. % $TiO_2$
0.0004 wt. % $V_2O_5$ There are obtained through a two-stage thermal decomposition (13) by simultaneous chlorination volatilization of the impurities from 270 kg alumina of the following composition:

0.02% $Fe_2O_3$
0.01% $SiO_2$
0.06% $Na_2O$
0.07% $K_2O$
0.03% CaO
0.003% $TiO_2$
0.008% $V_2O_5$

The angle of repose of the recovered impurity-free products amounts to 35°–37° at an $\alpha$-$Al_2O_3$ content of >80% having a specific surface area of about 20 $m^2/g$ and a bulk density amounting to >0.55 $g/cm^3$. Alumina manufactured in accordance with the invention meets all of the quality standards set by the aluminum industry.

From the decomposition gases, there is recovered the acid in an acid recovery apparatus (7) through adiabetic HCl absorption and this is utilized for further acid decomposition of clay or alumina containing minerals. The washing solution from the leaching stages (5,9) and a part of the weak acid evaporation condensate from the evaporator (12) of the extracted $AlCl_3$ solution of the crystallization are utilized in this connection.

The total $Al_2O_3$ recovered from the process amounts to 71%.

We claim:

1. Process for the preparation of pure aluminum oxide from clay or alumina containing minerals which comprises the steps of: mechanically pretreating the clay by applying sufficient shearing stress thereto to provide clay having a particle size of 2–15 mm; drying the mechanically pretreated clay at a temperature of 130°–250° C. to a residual moisture content not exceeding 3%; thermally actuating the mechanically pretreated clay at a temperature of 600°–800° C.; subjecting the thermally activated clay to leaching with hydrochloric acid having a concentration of 15–25%, wherein the hydrochloric acid is used in an amount of 80–120% of the stoichiometric amount calculated on $Al_2O_3$ and the temperature for the leaching is 105°–110° C.; separating the $SiO_2$ containing residue from the $AlCl_3$ solution formed in the leaching; subjecting the $SiO_2$ containing residue to washing to separately recover the washed $SiO_2$; extracting the $AlCl_3$ solution with an extraction agent consisting of a higher paraffin hydrocarbon for removing iron therefrom, said extraction agent being used in a ratio with respect to the $AlCl_3$ containing solution of 1:1 to 1:5; subjecting the organic phase containing iron to extraction with water; subjecting the now iron free aluminum chloride solution to evaporation to form a solution containing about 30 wt % of $AlCl_3$; thereafter subjecting the thusly evaporated solution to crystallization and recovering the crystals thus formed; subjecting the recovered crystals to a two stage thermal decomposition, the first stage being carried out at 150°–200° C. and the second stage at 1200°–1300° C.; recovering the pure $\alpha$ alumina thereby formed.

2. Process according to claim 1, wherein the thermally activated clay is classified according to particle size into a fraction having particle sizes of about 2 mm and a fraction having particle sizes of less than 2 mm.

3. Process according to claim 2, wherein the thermally activated clay having a particle size above 2 mm is subjected to a percolation leaching.

4. Process according to claim 2, wherein the thermally activated clay having a particle size below 2 mm is subjected to a suspension leaching.

5. Process according to claim 1, wherein the separation of the SiO2 containing residue from the $AlCl_3$ solution formed in the leaching is facilitated by the addition of a flocculating agent.

6. Process according to claim 5, wherein said flocculating agent is a polyacrylamide and is used in an amount of 10–100 g/m$^3$.

7. Process according to claim 1, wherein said higher paraffin hydrocarbon extraction agent contains 5–15% of a secondary alphatic amine having 6–12 carbon atoms and 20–40% of a higher aliphatic alcohol having 6–12 carbon atoms.

8. Process according to claim 1, wherein said crystallization is carried out by introducing the evaporated aluminum chloride solution into a boiling zone, forming a supersaturated solution and recovering the crystals thereby separated out.

9. Process according to claim 1, wherein the gas produced in the thermal decomposition of the crystals is treated for recovery of hydrochloric acid therefrom.

10. Process according to claim 1, wherein the water used in extracting the iron and $AlCl_3$ containing organic phase additionally contains dilute hydrochloric acid.

11. Process according to claim 1, wherein said higher paraffin hydrocarbon extraction agent contains tributylphosphate.

12. Process according to claim 1, wherein any gallium present in the iron containing extraction solution is recovered by extracting the said solution with an extraction agent comprising water containing an insoluble higher aliphatic alcohol in admixture with benzene, kerosine, a long chain aliphatic amine of n-tributyl phosphate.

13. Process according to claim 1, wherein the thermal activation is carried out utilizing the whirling bed principle.

* * * * *